United States Patent
Chen et al.

(10) Patent No.: US 12,106,541 B2
(45) Date of Patent: Oct. 1, 2024

(54) SYSTEMS AND METHODS FOR CONTRASTIVE PRETRAINING WITH VIDEO TRACKING SUPERVISION

(71) Applicant: Salesforce.com, Inc., San Francisco, CA (US)

(72) Inventors: Brian Chen, New York, NY (US); Ramprasaath Ramasamy Selvaraju, Atlanta, GA (US); Juan Carlos Niebles Duque, Palo Alto, CA (US); Nikhil Naik, Mountain View, CA (US)

(73) Assignee: Salesforce, Inc., San Francisco, CA (US)

( * ) Notice: Subject to any disclaimer, the term of this patent is extended or adjusted under 35 U.S.C. 154(b) by 307 days.

(21) Appl. No.: 17/589,709

(22) Filed: Jan. 31, 2022

(65) Prior Publication Data

US 2023/0154139 A1 May 18, 2023

Related U.S. Application Data (60) Provisional application No. 63/280,083, filed on Nov. 16, 2021.

(51) Int. Cl.
| | |
|---|---|
| G06V 10/00 | (2022.01) |
| G06V 10/44 | (2022.01) |
| G06V 10/46 | (2022.01) |
| G06V 10/62 | (2022.01) |

(52) U.S. Cl.
CPC .......... *G06V 10/454* (2022.01); *G06V 10/462* (2022.01); *G06V 10/62* (2022.01)

(58) Field of Classification Search
CPC ........ G06V 20/46; G06V 10/82; G06V 10/62; G06V 20/49; G06V 10/25; G06V 10/255; G06T 7/248; G06T 3/40
See application file for complete search history.

(56) References Cited

U.S. PATENT DOCUMENTS

| | | | |
|---|---|---|---|
| 11,748,988 B1* | 9/2023 | Chen ...................... | G06F 16/78 386/241 |
| 2020/0219268 A1* | 7/2020 | Liu ......................... | G06V 10/25 |
| 2021/0144442 A1* | 5/2021 | Liu ......................... | G06N 3/045 |
| 2021/0264261 A1* | 8/2021 | Staudinger ............. | G06N 3/044 |
| 2021/0365707 A1* | 11/2021 | Mao ..................... | G06V 10/235 |
| 2022/0172386 A1* | 6/2022 | Liu .......................... | G06T 7/73 |

OTHER PUBLICATIONS

Chen et al. "RSPNet: Relative Speed Perception for Unsupervised Video Representation Learning" 2020, arXiv:2011.07949v2 [cs.CV], pp. 1-8 (Year: 2020).*

\* cited by examiner

*Primary Examiner* — Molly Wilburn
*Assistant Examiner* — Ahmed A Nasher
(74) *Attorney, Agent, or Firm* — Haynes and Boone, LLP (57) ABSTRACT

Embodiments described herein provide an intelligent method to select instances, by utilizing unsupervised tracking for videos. Using this freely available form of supervision, a temporal constraint is adopted for selecting instances that ensures that different instances contain the same object while sampling the temporal augmentation from the video. In addition, using the information on the spatial extent of the tracked object, spatial constraints are applied to ensure that sampled instances overlap meaningfully with the tracked object. Taken together, these spatiotemporal constraints result in better supervisory signal for contrastive learning from videos.

20 Claims, 9 Drawing Sheets

| Method | Dataset | VOC07 clf. mAP | IN-1k clf. Top-1 acc. | PASCAL VOC Detection $AP^{bbox}_{all}$ | $AP^{bbox}_{50}$ | $AP^{bbox}_{75}$ | COCO Instance Segmentation $AP^{bbox}_{all}$ | $AP^{bbox}_{50}$ | $AP^{bbox}_{75}$ | $AP^{mask}_{all}$ | $AP^{mask}_{50}$ | $AP^{mask}_{75}$ |
|---|---|---|---|---|---|---|---|---|---|---|---|---|
| 1) Random Init | | - | - | 33.8 | 60.2 | 33.1 | 36.7 | 56.7 | 40.0 | 33.7 | 53.8 | 35.9 |
| 2) ImageNet Fully Sup | | - | - | 53.5 | 81.3 | 59.1 | 38.9 | 59.6 | 42.7 | 35.4 | 56.5 | 38.1 |
| 3) MoCo | K400 | 69.3 | 47.3 | 50.6 | 78.0 | 55.1 | 40.5 | 58.9 | 41.9 | 35.1 | 55.6 | 37.3 |
| 4) + Tracking Con. Sampling | K400 | 70.4 +1.1 | 48.2 +0.9 | 51.2 +0.6 | 78.4 +0.4 | 56.1 +1.0 | 40.8 +0.3 | 59.5 +0.6 | 42.6 +0.7 | 35.8 +0.7 | 56.8 +1.2 | 38.3 +1.0 |
| 5) + PreViTS | K400 | 71.2 +1.9 | 48.6 +1.3 | 51.8 +1.2 | 78.3 +0.3 | 56.0 +0.9 | 41.0 +0.5 | 59.4 +0.5 | 42.8 +0.9 | 35.6 +0.5 | 57.2 +1.6 | 38.4 +1.1 |
| 6) MoCo | VGG Sound | 68.3 | 46.9 | 48.3 | 76.5 | 52.6 | 38.4 | 58.7 | 41.9 | 35.0 | 55.8 | 37.2 |
| 7) + Tracking Con. Sampling | VGG Sound | 70.3 +2.0 | 48.1 +1.2 | 49.0 +0.7 | 77.1 +0.6 | 52.7 +0.1 | 38.3 -0.1 | 58.7 +0.0 | 41.7 -0.2 | 35.0 +0.0 | 55.9 +0.1 | 37.6 +0.4 |
| 8) + PreViTS | VGG Sound | 73.0 +4.7 | 50.6 +3.7 | 52.5 +4.2 | 78.7 +2.2 | 55.1 +2.5 | 39.4 +1.0 | 59.8 +1.1 | 43.0 +1.1 | 35.7 +0.7 | 56.8 +1.0 | 38.2 +1.0 |

FIG. 6

| Method | Dataset | UCF-101 |
|---|---|---|
| RSPNet | VGG Sound | 86.4 |
| + Tracking Constrained Sampling | VGG Sound | 87.5 +1.1 |
| + PreViTS | VGG Sound | 88.9 +2.5 |
| RSPNet | K400 | 87.6 |
| + Tracking Constrained Sampling | K400 | 89.1 +1.5 |
| + PreViTS | K400 | 91.8 +4.2 |

FIG. 7

| Method | Dataset | Backbone | UCF-101 |
|---|---|---|---|
| CoCLR | K400 | S3D-g | 87.9 |
| RSPNet | K400 | S3D-g | 89.6 |
| ASCNet | K400 | S3D-g | 90.8 |
| GDT | K400 | R(2+1)D | 90.9 |
| RSPNet + PreViTS | K400 | S3D-g | 91.8 |

SYSTEMS AND METHODS FOR CONTRASTIVE PRETRAINING WITH VIDEO TRACKING SUPERVISION

CROSS REFERENCE(S)

The present application is a nonprovisional of and claims priority under 35 U.S.C. 119 to U.S. provisional application No. 63/280,083, filed on Nov. 16, 2021, which is hereby expressly incorporated by reference herein in its entirety.

TECHNICAL FIELD

The present disclosure relates generally to machine learning models and video processing, and more specifically, to contrastive pretraining with video tracking supervision.

BACKGROUND

Video processing may include various types of downstream tasks. For example, a machine learning system may be trained to identify an object in a streaming video, to detect an action start, and/or the like. Self-supervised learning (SSL) of visual representations has recently been widely applied in training machine learning systems to perform computer vision and video processing tasks, because SSL does not require manually annotated labels, thus largely reducing the costly manual labor for training data annotation. A common approach of SSL from images is contrastive learning, a learning objective that pulls different data augmentations from the same instances to be closer to each other and pushes data augmentations from different instances away. However, not all of the commonly used augmentations in images reflect the visual variability in the real world. In contrast, videos provide a natural source of data augmentation, with objects undergoing deformations and occlusions, along with changes in viewpoints and illumination.

In the figures and appendix, elements having the same designations have the same or similar functions.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

To learn representations from videos, a common approach is to sample nearby frames in videos as a natural way of data augmentation that represents the same instance, since frames that are close in time are likely to share similar content. However, this sampling strategy for augmentation suffers from a few problems. First, when sampling instances from a longer span of the video, the content might change substantially, resulting in samples containing totally different semantic concepts. This sampling strategy results in an imperfect supervisory signal that does not encourage semantic understanding. Second, when sampling instances from the same video, it is possible that the background in the two instances from the video is quite similar, which allows the model to cheat by looking at the background for minimizing contrastive loss. This sampling strategy leads to models learning spurious background correlations and context, which could make them less transferable and potentially biased.

To alleviate the two problems mentioned above, embodiments described herein provide an intelligent method to select instances for contrastive pretraining, by utilizing unsupervised tracking for videos. Using this freely available form of supervision, a temporal constraint is adopted for selecting instances that ensures that different instances contain the same object while sampling the temporal augmentation from the video. In addition, using the information on the spatial extent of the tracked object, spatial constraints are applied to ensure that sampled instances overlap meaningfully with the tracked object. Taken together, these spatiotemporal constraints result in better supervisory signal for contrastive learning from videos.

In one embodiment, given an input video, unsupervised tracking and temporal constraints are applied to the input video to extract continuous frames that contain the tracked object region. An intersection over union (IoU) based spatial constraint is further applied to sample query and key video clips along with their masks. The encoder representations for the query and key crops are aligned through a contrastive loss.

In one embodiment, building on spatio-temporal sampling, the SSL model is trained to track the same object across different frames in the video. Specifically, given 2 clips that are obtained via the spatio-temporal sampling approach described above, a Grad-CAM attention map is generated to localize the salient object from one clip on the other. The Grad-CAM attention maps are then used to generate an attention loss to update the SSL model, such that the SSL model focuses on the tracked object across different frames occurring in different poses in order to learn meaningful object concepts.

FIGS. 1A-1D provide simplified diagrams illustrating existing problems of data augmentation in generating query and key clips for contrastive learning, according to one or more embodiments described herein. Various examples show that existing methods for contrastive video self-supervised learning may generate an imperfect supervisory signal and can rely on background correlations when learning representations.

Figure 1A:
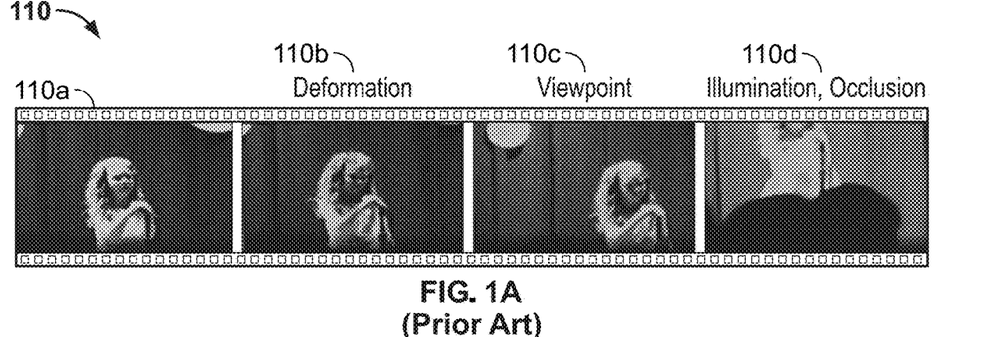
FIGS. 1A-1D provide simplified diagrams illustrating existing problems of data augmentation in generating query and key clips for contrastive learning, according to one or more embodiments described herein.

FIG. 1A shows video frames 110a-d evolve over a period of time in the streaming video 110. The temporal transformations of the video 110 provide a natural source of data augmentation. For example, frames 110a-d can be used as different augmented versions of the image sample that contains a young girl.

Figure 1B:
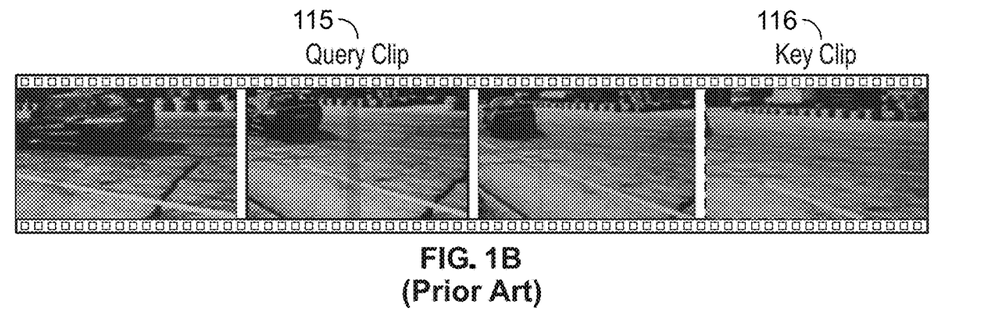

FIG. 1B shows a query clip 115 and a key clip 116 randomly sampled from video frames. However, these randomly selected query and key clips in contrastive video SSL may lead to missing objects. For example, the key clip does not contain the desired object of a moving car.

Figure 1C:
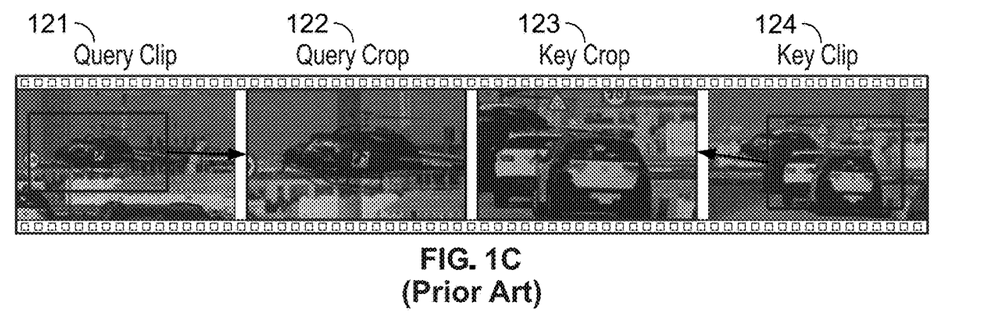

FIG. 1C shows a query clip 121 (based on which query crop 122 is generated) and a key clip 123 (based on which key crop 124 is generated) randomly sampled from video frames. However, the shown query 122 and key 124 contain different visual concepts altogether, as the query shows a blue helicopter, but the key shows a yellow car.

Figure 1D:
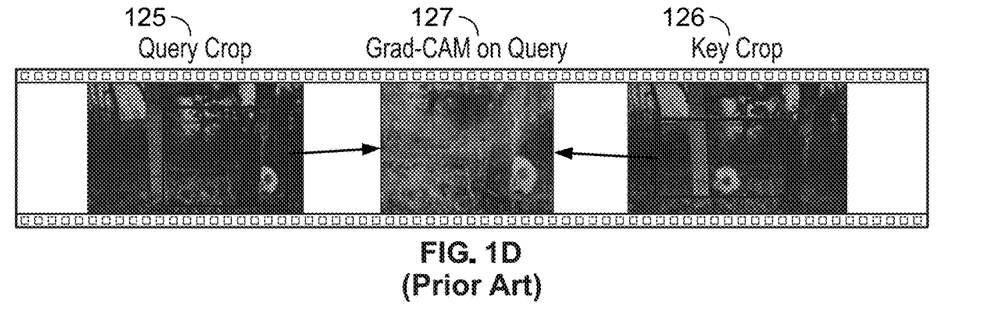

FIG. 1D shows a query crop 125, a key crop 126 and the Grad-CAM attention map 127 of the query. As shown, because many video frames may have a fixed background (e.g., the tree trunk in both the query crop 125 and key crop 126), SSL models may mistakenly focus on the background, e.g., by learning about the representation of the tree trunk instead of the desired object, the soccer ball.

Figure 2:
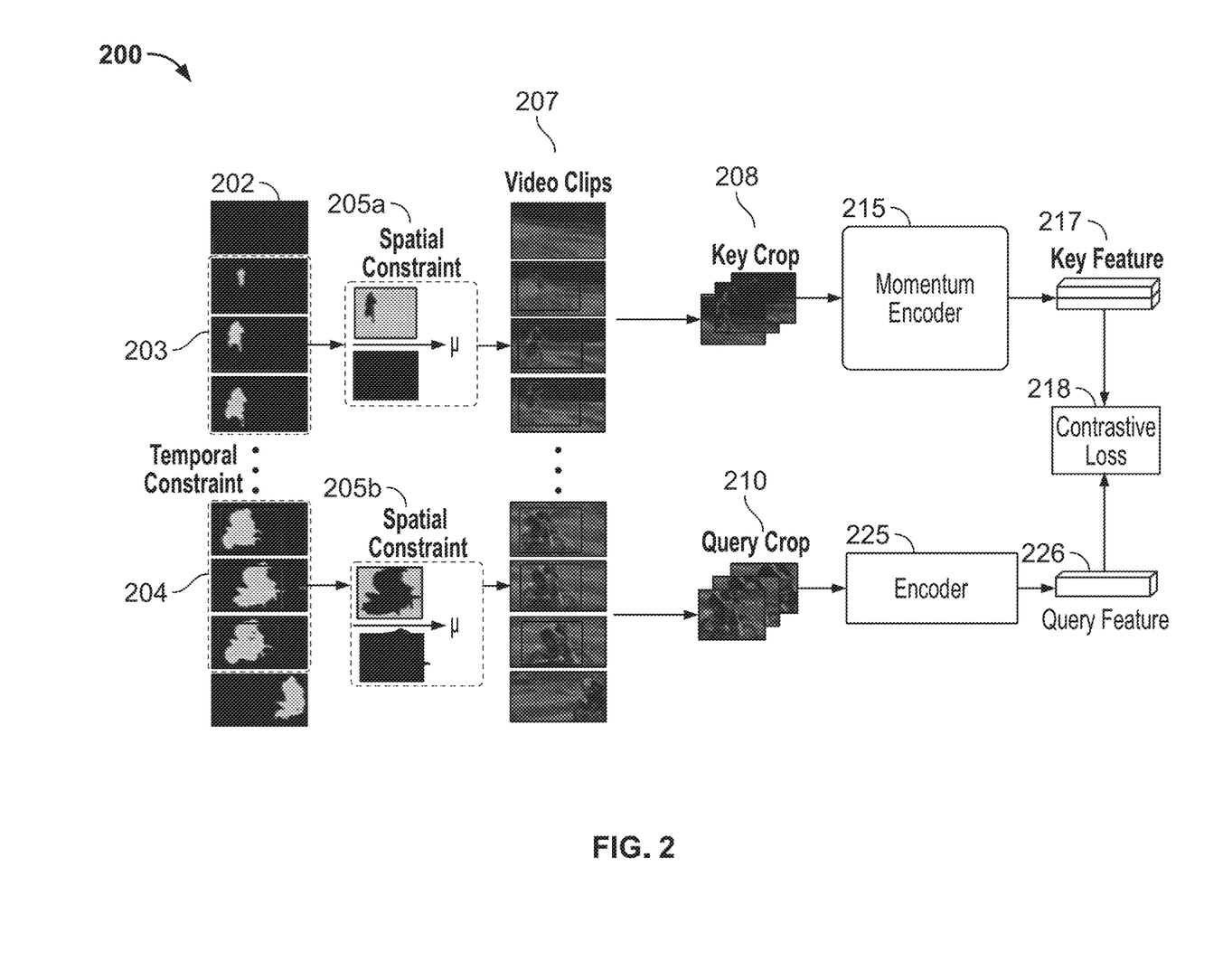
FIG. 2 is a simplified block diagram illustrating an example framework of spatio-temporal cropping based on video tracking for contrastive learning, according to one or more embodiments described herein.

FIG. 2 is a simplified block diagram 200 illustrating an example framework of spatio-temporal cropping based on video tracking for contrastive learning, according to one or more embodiments described herein. Given an input video, diagram 200 shows that unsupervised tracking and temporal constraints are applied to a video stream 207 to extract continuous frames that contain the tracked object region.

In one embodiment, a video stream 207 is received, containing a number of video frames (clips) may be used to select query and key clips. To select query clips and key clips containing same visual concepts, unsupervised object tracking may be used in videos to guide clip selection. Specifically, an unsupervised saliency prediction algorithm, such as Deep-USPS (Oord et al., Representation learning with contrastive predictive coding. ArXiv preprint, 2018), may be applied on the received video 207 to acquire unsupervised tracking information in the video 207 to obtain a saliency map for the initial frame in the video.

For example, given an input video V with height h, width w and temporal length t, a video object segmentation map $M \in \{0, 1\}^{h \times w \times t}$ is generated, where $M_{ijk}=1$ indicates pixel (i, j, k) is salient, and area of salient region in time t is $A_M^t = \Sigma_{i,j} M_{i,j}$. The saliency map is a binary mask, e.g., as shown by the black and white saliency map 202. As a large majority of the web videos (and as a result, videos in vision datasets) are centered on a single object, one (the largest) salient region may be determined in the video for tracking.

In one embodiment, the resulting saliency map 202 may then be used as the target object for tracking. A tracking algorithm (such as SORT in Bewley et al., Simple online and real-time tracking, in proceedings of Simple online and Realtime tracking, 2016) may then be applied on the video 207 to check the intersection over union (IOU) constraint across continuous frame masks to track the target object through the video 207. Therefore, one or more sets of continuous frames, referred to as tracking tubes, such as 203 or 204 may be sampled satisfying the IOU constraint.

Once the tracking tubes 203 or 204 are obtained for the video 207, random sampling may be performed on video segments covered by the tracking tubes 203-204, where $A_M^t \neq 0$. This ensures sampled instances query and key will contain meaningful instances, and also, both will contain the same object in the video. The sampled video segments according to the tracking tubes 203-204 for query and key are represented as $M_q$ and $M_k$.

In addition to the temporal constraint resulting in tracking tubes 203-204, a spatial constraint (shown at 205a-b) may be applied to random cropping using the IOU threshold. Specifically, the random crop for the query or key should have at least $\mu \in [0, 1)$ IOU with the tracking mask. This spatial constraint tries to ensure that the query and key represent the same semantic object for contrastive pretraining. Along with the sampled query crop 210 and the key crop 208, two 3D masks are obtained for the query and the key, denoted by $M_q$ and $M_k$, which represents the mask of the query and key containing salient image regions.—For example, the resulting key crop 208 and the query crop 210 subject to the temporal constraint and the spatial constraints 205a-b represent the same visual concept such that the model may learn to localize specific regions.

In one embodiment, the sampled query crop 210 and the key crop 208 may be used for contrastive training of the model. For example, the sampled query crop 210 and the key crop 208 may form a positive pair for contrastive learning, while the sampled query crop 210 paired with keys from different videos may form negative pairs. A momentum encoder 215 may then encode the key crop 208 into key feature representation 217. Specifically, the momentum encoder 215 may store negative samples in a dynamic memory bank with a moving average encoder that takes an exponential average of encoded features. Additional details of the momentum encoder 215 may be found in Henaff et al., Data-efficient image recognition with contrastive predictive coding, in Proceedings of international conference on machine learning (ICML), 2020.

For example, the sampled query crop 210, denoted by q, and the key crop 208, denoted by k, sampled from the same video 207, may form a positive pair. The goal of contrastive learning is to pull the feature distance of the positive pairs q and k to be closer and push the features of query q away from a negative set of features from other videos $N=\{n_1, n_2, \ldots, n_m\}$.

In one embodiment, an encoder 225 may encode the query crop 210 into query feature representation 226. Thus, a momentum contrastive loss 218 may be computed based on the momentum key feature 217 and the query feature 226 by:

$$\mathcal{L}_{MoCo} = -\log \frac{\exp(q \cdot k)/\tau}{\sum_{n \in \{N,k\}} \exp(q \cdot n)/\tau}, \quad (1)$$

where $\tau$ is the temperature constant. In one implementation, the length of query and key segment q and k may be set to 1 to extract individual frames from same video as positives, instead of video clips.

In one embodiment, in addition to the momentum contrastive loss, a relative speed prediction task may be used to further train the model. Specifically, three video segments may be sampled, with two segments having the same speed and another with a different speed. Video segments sampled with the same speed may form a positive pair, while segments sampled from different speeds form negative pairs. The goal is to pull the feature distance for segments with the same speed closer together while pushing the features for the segment with different speed away. A triplet loss may be computed applied as follows:

$$\mathcal{L}_{Speed} = \max(0, \gamma - (\text{pair}^+ - \text{pair}^-)), \quad (2)$$

where the distance of positive pairs pair+ is usually larger than the negative pairs pair− by a margin $\gamma > 0$.

In one embodiment, the momentum contrastive loss 218 (optimally combined with the speed loss shown in Eq. (3)) may be used to backpropagate the momentum encoder 215 and the encoder 225.

Figure 3:
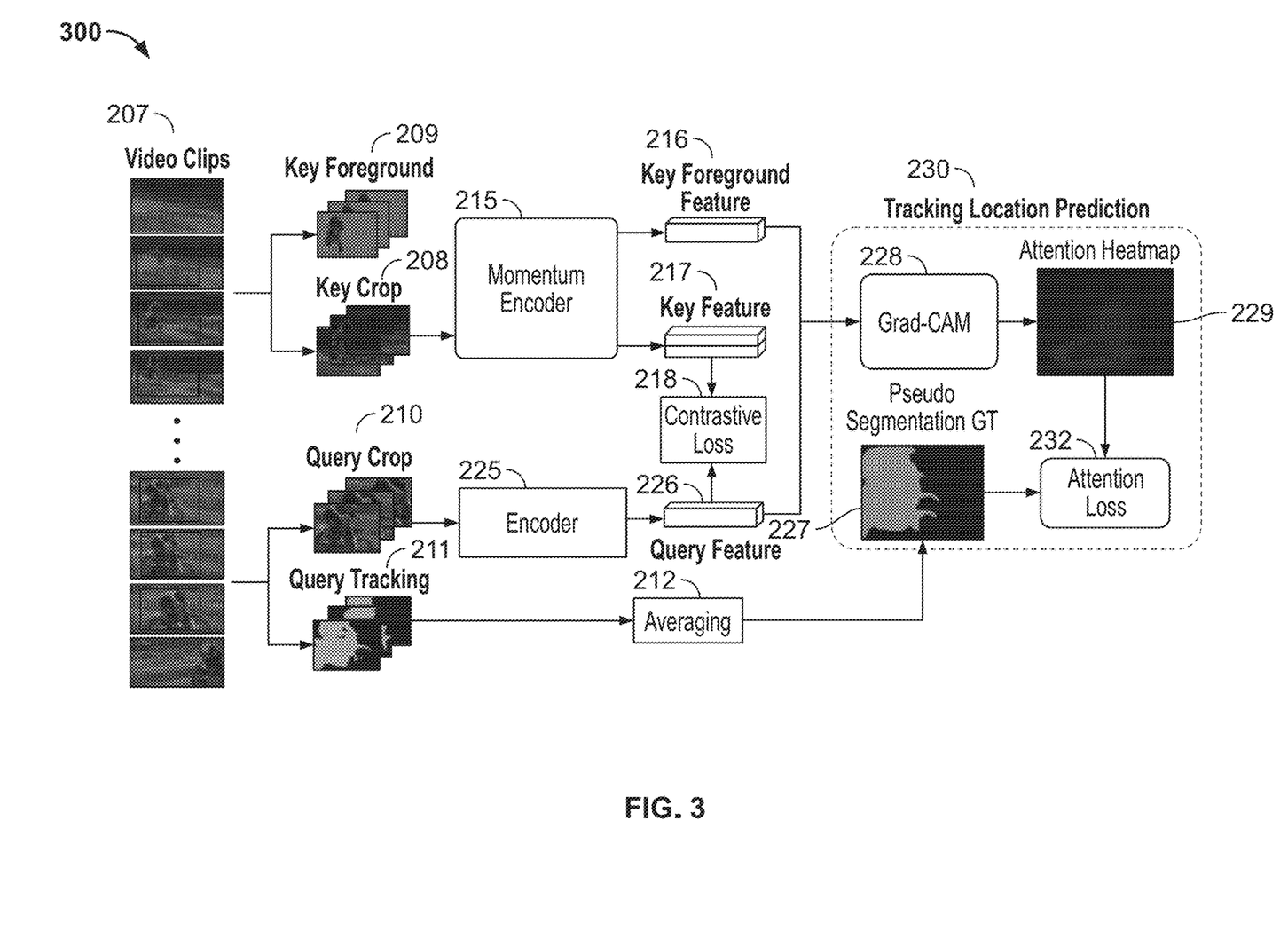
FIG. 3 is an example block diagram illustrating an example framework that extends the framework shown in FIG. 2 for video tracking supervision, according to one embodiment described herein.

FIG. 3 is an example block diagram 300 illustrating an example framework that extends the framework shown in FIG. 2 for video tracking supervision, according to one embodiment described herein. Diagram 300 shows a tracking location learning module 230 that receives an input from the momentum encoder 215 and the encoder 225. In one embodiment, diagram 300 shows that in addition to the key crop 208 and query crop 210 sampled from the video 207 subject to the spatial and temporal constraints described in relation to FIG. 2, a key foreground 209 corresponding to the sampled key crop 208 is obtained. Meanwhile, a query tracking mask 211 is obtained from the sampled query crop 210.

Specifically, as the query and key segment background might be similar, the model might rely on low-level background information, as shown in FIG. 1D. To avoid that, instead of directly employing the key crop 208, a key foreground feature 209 is generated based on the positive sample key k. For example, a masked key $k^m = k * M_k$ is computed as the key foreground feature 209 by using the video segmentation mask as a filter. In this way, the key foreground 209 captures the tracked salient foreground object in the video, neglecting the background. The momentum encoder 215 may then encode the key foreground 209 into key foreground feature 216, which is fed to the Grad-CAM module 228 in the tracking location learning module 230.

The Grad-CAM module 228 may localize the regions in the query that maximize the (masked-key, query) similarity. Specifically, an importance of the visual encoder 225 (denoted by $f_q$) is computed, when the momentum contrastive learning framework shown based on contrastive loss 218 (described in relation to FIG. 2) tries to match spatial regions of the query q 210 and key k 208 to be positive pair while pushing other negative pairs away. The key foreground feature 216 and the query feature 216 may then be input to the Grad-CAM module 228 in the tracking location learning module 230 to compute the importance, which may in turn be used to compute a Grad-CAM heatmap 229 in a contrastively-trained fashion. Specifically, given the query crop 208, the model is trained to classify a positive sample key k from other negatives N. The query and key pair is forward-propagated into the trained encoder 225, and the gradients flowing from the last convolutional layer activations of the encoder 225 $A_{conv5}^{f_q}$ is computed to reflect which region in the query crop 210 leads the model to select the correct key. The importance level of the last convolutional layer neuron in the encoder 225 may be computed when the query crop feature 226 matches with the masked key foreground feature 216. Specifically, the importance $\alpha_q$ is computed based on the masked key divided by gradients of $A_{conv5}^{f_q}$ via backpropagation, which is aggregated through a global pooling layer:

$$\alpha_q = \underbrace{\sum_{i,j}}_{\text{global pooling}} \underbrace{\frac{\partial q \cdot k^m}{\partial A_{conv5}^{f_q}}}_{\text{gradients via backdrop}} . \tag{3}$$

wherein the indices i, j correspond to spatial regions in the map such that the global pooling aggregates over all regions in the map. Thus, by multiplying $\alpha_q$ with the last convolutional layer $A_{conv5}^{f_q}$, the Grad-CAM module 228 computes a forward activation map via a rectifier linear unit (ReLU), e.g., the Grad-CAM heatmap $G_q$ 229 which represents which region is used when mapping query to masked key may be computed as:

$$G_q = ReLU\Big(\underbrace{\sum_n \alpha_q A_{conv5}^{f_q}}_{\text{linear combination}}\Big). \tag{4}$$

wherein the index n denotes the number of channels in the convolution layer such that a weighted sum of $A_{conv5}^{f_q}$ is computed along the channel dimension.

On the other hand, the query tracking masks 211 corresponding to the query crop 210 may be applied with an averaging operation 212. The resulting averaged query mask may then be fed to the tracking location learning module 230 as the pseudo segmentation ground truth 227, denoted by $M_q$.

To encourage the Grad-CAM heatmap $G_q$ to be close to tracked object mask in the query segment $M_q$, the attention loss module 232 computes a cosine-distance based attention loss based on the Grad-CAM heatmap $G_q$ and the pseudo segmentation ground truth 227. The attention loss enforces the model to learn similar representations for the object irrespective of the viewpoint and transformation changes that might be present in the clips when the frames are temporally far away. For example, the attention loss is computed as:

$$\mathcal{L}_{att} = 1 - \frac{G_q \cdot M_q}{\|G_q\| \, \|M_q\|}. \tag{5}$$

In one embodiment, the model (including the momentum encoder 215 and the encoder 225) may be trained to minimize the sum of the losses described above. For example, for image-only models, the sum of the momentum contrastive loss and the attention loss may be used to update the model:

$$\mathcal{L}_{Image} = \mathcal{L}_{MoCo} + \lambda \mathcal{L}_{Att}. \tag{6}$$

For another example, for video models, a weighted sum of the momentum contrastive loss (Eq. (1)), the speed prediction loss (Eq. (2)) and the attention loss (Eq. (5)) may be used to update the model.

Figure 4:
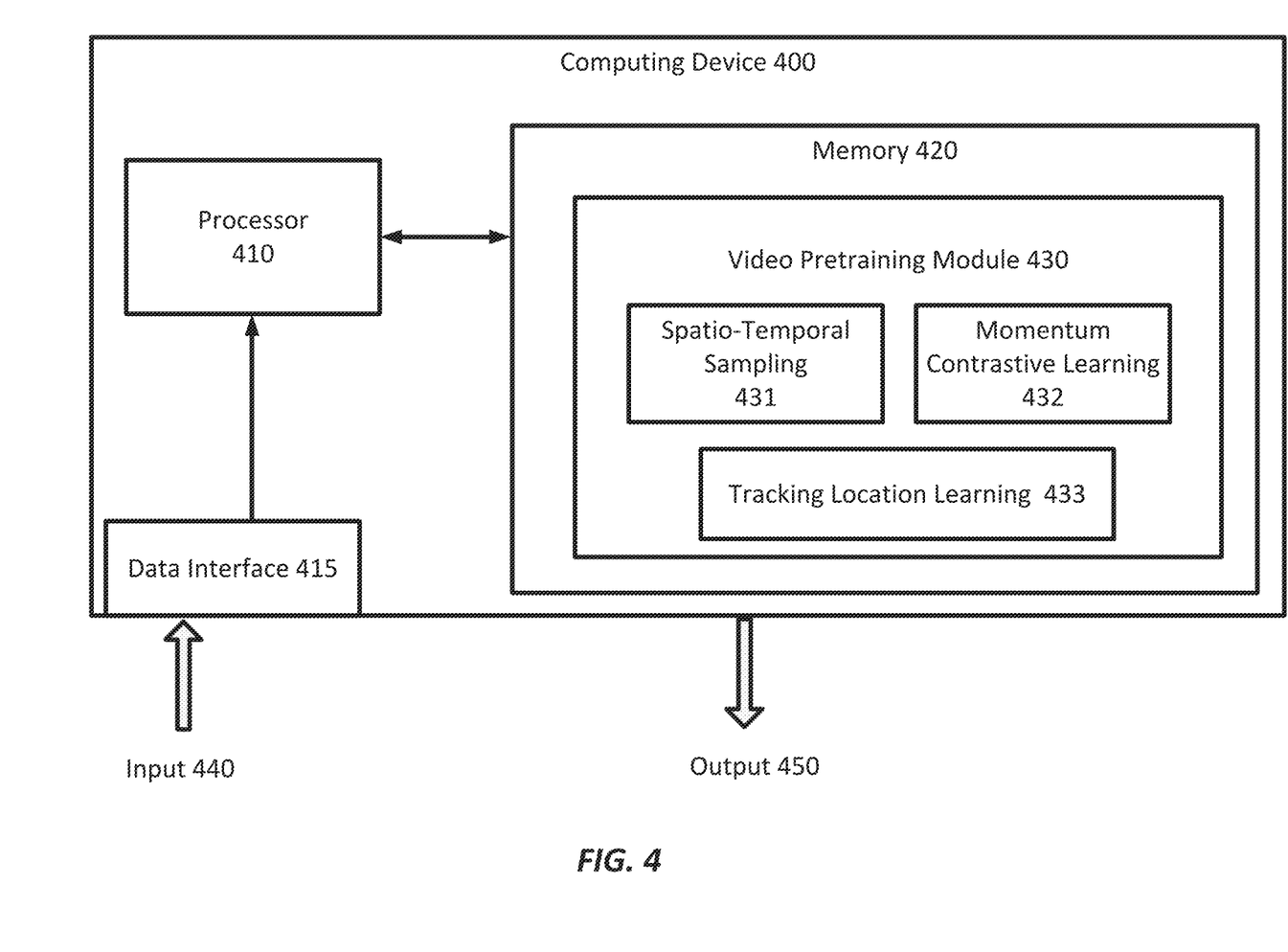
FIG. 4 is a simplified diagram of a computing device for implementing the contrastive pretraining framework with video tracking supervision described in FIGS. 2-3, according to some embodiments.

FIG. 4 is a simplified diagram of a computing device for implementing the contrastive pretraining framework with video tracking supervision described in FIGS. 2-3, according to some embodiments. As shown in FIG. 4, computing device 400 includes a processor 410 coupled to memory 420. Operation of computing device 400 is controlled by processor 410. And although computing device 400 is shown with only one processor 410, it is understood that processor 410 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 400. Computing device 400 may be implemented as a stand-alone subsystem, as a board added to a computing device, and/or as a virtual machine.

Memory 420 may be used to store software executed by computing device 400 and/or one or more data structures used during operation of computing device 400. Memory 420 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 410 and/or memory 420 may be arranged in any suitable physical arrangement. In some embodiments, processor 410 and/or memory 420 may be implemented on a same board, in a same package (e.g., system-in-package), on a same chip (e.g., system-on-chip), and/or the like. In some embodiments, processor 410 and/or memory 420 may include distributed, virtualized, and/or containerized computing resources. Consistent with such embodiments, processor 410 and/or memory 420 may be located in one or more data centers and/or cloud computing facilities.

In some examples, memory 420 may include non-transitory, tangible, machine readable media that includes executable code that when run by one or more processors (e.g., processor 410) may cause the one or more processors to perform the methods described in further detail herein. For example, as shown, memory 420 includes instructions for a video pretraining module 430 that may be used to implement and/or emulate the systems and models, and/or to implement any of the methods described further herein. In some examples, the video pretraining module 430, may receive an input 440, e.g., such as an input video stream via a data interface 415. The video pretraining module 430 may generate an output 450 such as a video processing output of an identified object in response to the input 440.

In one embodiment, the video pretraining module 430 may further include sub-modules such as the spatio-temporal sampling module 431, momentum contrastive learning module 432 and a tracking location learning module 433. The spatio-temporal sampling module 431 may apply temporal constraints to extract continuous frames within tracking tubes (e.g., 203, 204 in FIG. 2) that contain the tracked object region. The spatio-temporal may further apply IoU based spatial constraints to sample query and key video clips along with their masks, as described in relation to FIG. 2.

The momentum contrastive learning module 432 may compute a momentum contrastive loss (e.g., 218 in FIG. 2) to align encoder representations for the query and key (e.g., 217 and 226 in FIG. 2). The tracking location learning module 433 may be similar to module 230 in FIG. 3, which may compute a Grad-CAM heatmap (e.g., 229 in FIG. 3) to localize the regions in the query that maximize the (masked-key, query) similarity. The tracking location learning module 433 then compare the Grad-CAM heatmap against the tracked query mask (e.g., the averaged pseudo segmentation ground truth 227 in FIG. 3) using a cosine distance loss (e.g., the attention loss 232 in FIG. 3) to encourage models to rely on appropriate salient object regions during contrastive pretraining.

Figure 5A:
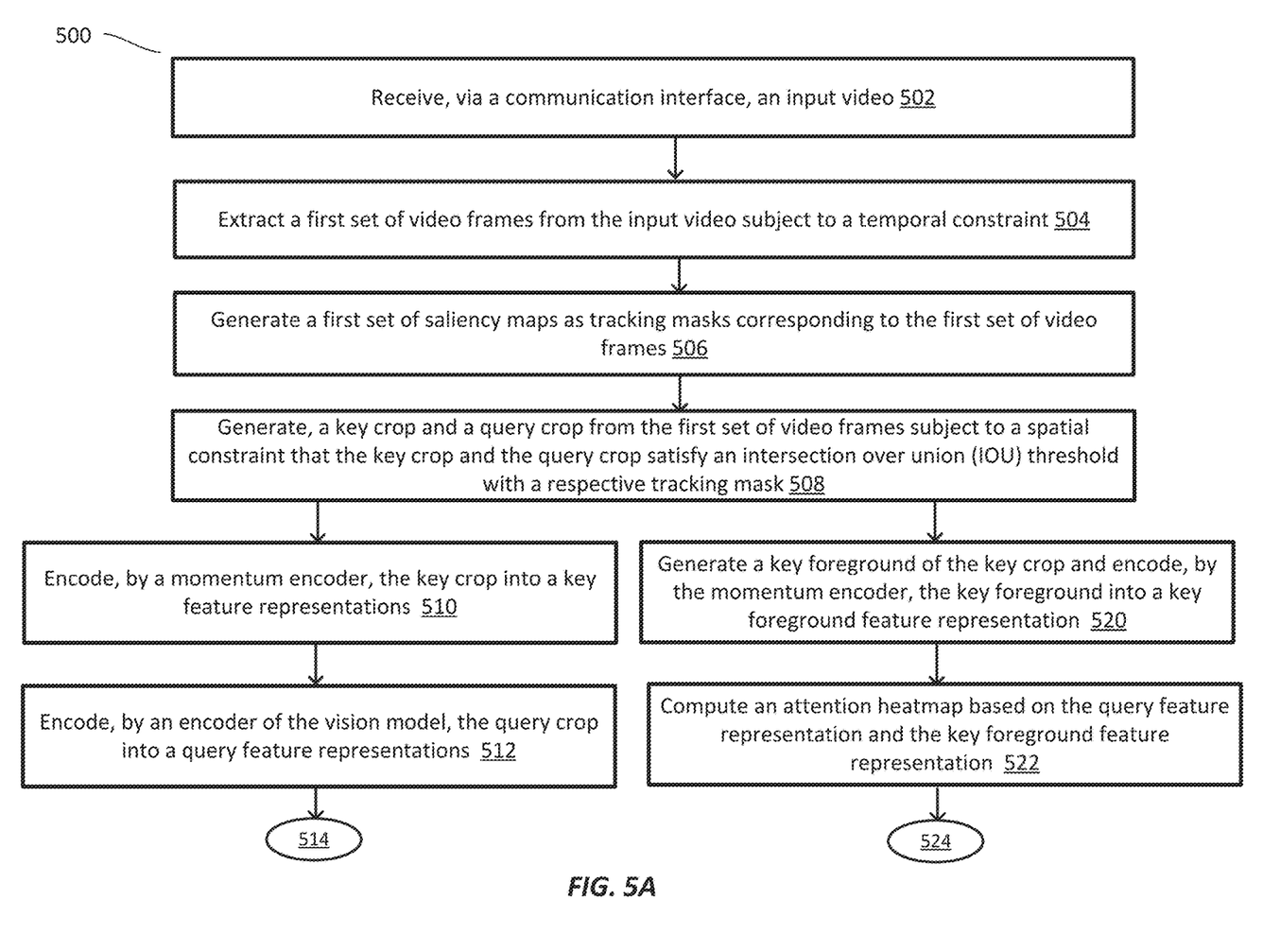
FIGS. 5A-5B provide a simplified logic flow diagram illustrating a method of pretraining a vision model, according to some embodiments described herein.
Figure 5B:
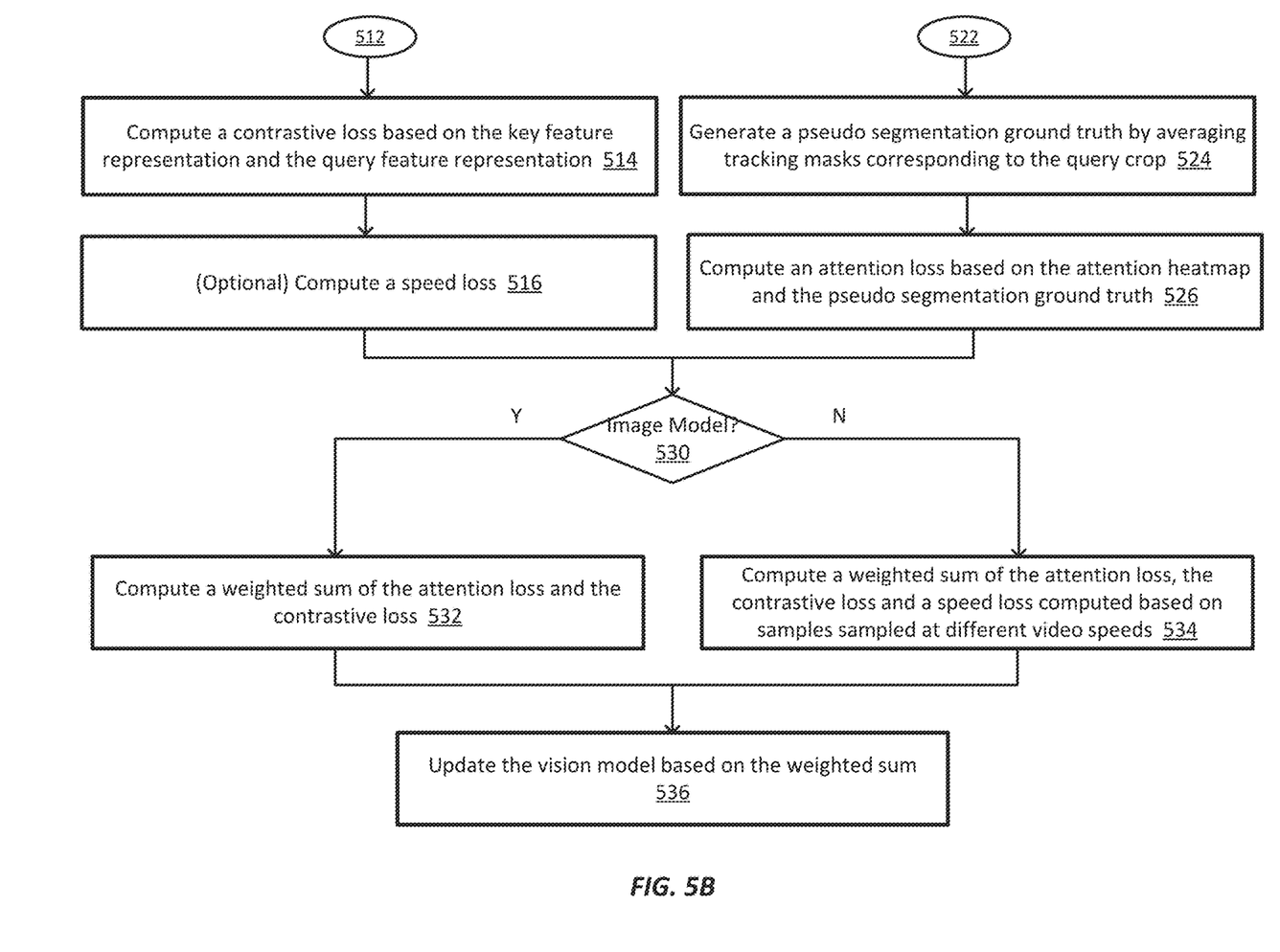

Additional functionality of the video pretraining module 430 is described in the flow diagram in FIG. 5. In some examples, the video pretraining module 430 may be implemented using hardware, software, and/or a combination of hardware and software.

Some examples of computing devices, such as computing device 400 may include non-transitory, tangible, machine readable media that include executable code that when run by one or more processors (e.g., processor 410) may cause the one or more processors to perform the processes of method 500 in FIG. 5. Some common forms of machine readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

FIGS. 5A-5B provide a simplified logic flow diagram illustrating a method of pretraining a vision model, according to some embodiments described herein. One or more of the processes of method 500 may be implemented, at least in part, in the form of executable code stored on non-transitory, tangible, machine-readable media that when run by one or more processors may cause the one or more processors to perform one or more of the processes. In some embodiments, method 500 corresponds to the operation of the video pretraining module 430 (FIG. 4) to perform contrastive pretraining with video tracking supervision.

At step 502, an input video (e.g., video 207 in FIGS. 2-3) is received via a communication interface (e.g., 415 in FIG. 4).

At step 504, a first set of video frames are extracted from the input video subject to a temporal constraint. For example, each of the first set of video frames corresponds to a respective area of salient region that is non-zero. The first set of video frames are sampled by obtaining a saliency map for an initial frame of the input video and tracking a target object in the saliency map throughout the input video by checking an IOU constraint across continuous frame masks in the input video. The first set of video frames may correspond to the tracking tubes 203, 204 shown in FIG. 2.

At step 506, a first set of saliency maps are generated as tracking masks corresponding to the first set of video frames. For example, the saliency maps are binary masks.

At step 508, a key crop (e.g., 208) and a query crop (210) are sampled from the first set of video frames subject to a spatial constraint (e.g., 205a-b) that the key crop and the query crop satisfy an intersection over union (IOU) threshold with a respective tracking mask.

Method 500 may then proceed to the branch starting with step 510 and the branch starting with step 520 in parallel, intermittently, or alternately. At step 510, a momentum encoder encodes the key crop into a key feature representation (e.g., 216). At step 512, an encoder of the vision model encodes the query crop (e.g., 210) into a query feature representation (e.g., 226).

At step 514, a contrastive loss is computed based on the key feature representation and the query feature representation. For example, the key crop and the query crop that are sampled from the same input video serve as a positive pair for contrastive learning, and the key crop paired with another query crop sampled from another different video form a negative pair for contrastive learning. The contrastive loss may be computed according to Eq. (1).

On the other hand, at step 520, a key foreground (e.g., 209) of the key crop is generated, ignoring the background, and the momentum encoder encodes the key foreground into a key foreground feature representation (e.g., 216). At step 522, an attention heatmap 229 is computed based on the query feature representation (e.g., 226) and the key foreground feature representation (e.g., 216). For example, the attention heatmap (e.g., 229) is computed based on a linear combination of a product between a last convolutional layer activation of the encoder (e.g., 225) and an importance metric of the last convolution layer of the encoder, e.g., according to Eq. (4). The importance metric of the last convolution layer of the encoder is computed based on the key foreground feature representation (e.g., 216) and gradients of the last convolutional layer activations of the encoder, e.g., according to Eq. (3).

At step 524, a pseudo segmentation ground truth is generated by averaging tracking masks corresponding to the query crop. At step 526, an attention loss is computed based on the attention heatmap (e.g., 229) and the pseudo segmentation ground truth (e.g., 227), e.g., according to Eq. (5).

In one embodiment, at step 516, a speed loss may be computed. For example, a first video segment and a second video segment having a same speed, and a third video segment having a different speed may be sampled from the input video. The first video segment and the second video segment may form a positive input pair. The first video segment or the second video segment and the third video segment may form a negative input pair. The positive input pair and the negative input pair may be input to the vision model, from which a speed loss is computed based on a difference between a distance between the positive input pair and the negative input pair in a feature space and a predefined margin, e.g., according to Eq. (2).

Method 500 then determines whether the vision model being trained is an image model or a video model at step 530. If the vision model is an image model, a weighted sum of the attention loss and the contrastive loss is computer at step 532. If the vision model is a video model, a weighted sum of the attention loss, the contrastive loss and a speed loss computed based on samples sampled at different video speeds is computed. At step 536, the vision model may be updated based on the weighted sum, e.g., via backpropagation.

Example Performance

FIGS. 6-12 provide example data performance charts and examples for illustrating example performance of embodiments described herein.

The framework described in FIGS. 2-3 are pre-trained on two datasets in example data experiments, e.g., both of which consist of 10 second-long videos at 25 FPS: (1) The training set of VGG-Sound (Chen et al., Vggsound: A large-scale audio-visual dataset, in 2020 IEEE International Conference on Acoustics, Speech and Signal Processing, 2000), which contains 200 k videos collected from YouTube. VGG-Sound was collected with the objective of creating an audio-visual dataset with diverse sounds and contains 300 classes as defined by audio labels. It contains a wider variety of object classes and higher object-centricity as compared to action classification datasets common in the video understanding literature. (2) The Kinetics-400 dataset (Carreira et al., Quo vadis, action recognition? A new model and the kinetics dataset, in 2017 IEEE Conference on Computer Vision and Pattern Recognition, 2017), which consists of around 240 k training videos with 400 human action classes. Kinetics-400 is a widely-used dataset, which is used to compare PreViTS's performance to prior methods.

For experiments with the image model, ResNet-50 backbone is used and one frame is sampled with 224×224 spatial sizes for each clip. For experiments with the video model, an S3D-g backbone is used to sample 16 continuous frames with 224×224 spatial sizes for each clip. Standard data augmentation is performed on clips, including random Gaussian blur, and random color jitter. All models are trained with 200 epochs with SGD and a batch size of 256. A cosine learning rate scheduler is used with an LR of 0.03 for the image model and 0.5 for the video model, $\tau=0.07$, $K=65535$, $\gamma=0.15$, $\mu=0.3$, $\lambda=3$. The framework shown in FIGS. 2-3 (referred to as "PreViTS") is implemented with 16 A100 GPUs. The training time is two days for pretraining VGG-Sound and three days for pretraining on Kinetics.

For both image and video tasks, the following baselines are compared: (1) Random Init of weights without pretraining, (2) MoCo/RSPNet to demonstrate standard self-supervised model performance for image (MoCo) and video (RSPNet), (3) MoCo/RSPNet+Tracking Constrained Sampling to evaluate our unsupervised tracking-based spatial-temporal sampling strategy.

The learned features by PreViTS are evaluated on four downstream image recognition tasks: (a) PASCAL VOC (Everingham et al., the pascal visual object classes (VOC) challenge. IJCV, 2009) linear classification, (b) ImageNet-1 k (Deng et al., Imagenet: A large-scale hierarchical image database. In 2009 IEEE Computer Society Conference on Computer Vision and Pattern Recognition (CVPR 2009), 2009) linear classification, (c) PASCAL VOC object detection, and (d) COCO (Lin et al., Microsoft COCO: Common objects in context, in proceedings of ECCV, 2014) instance segmentation. For (a, b), linear classification is performed by using the SSL model as a frozen feature extractor and training a classifier on top. For (c, d), the SSL model is used as weight initialization for fine-tuning on the labeled datasets.

Figure 6:
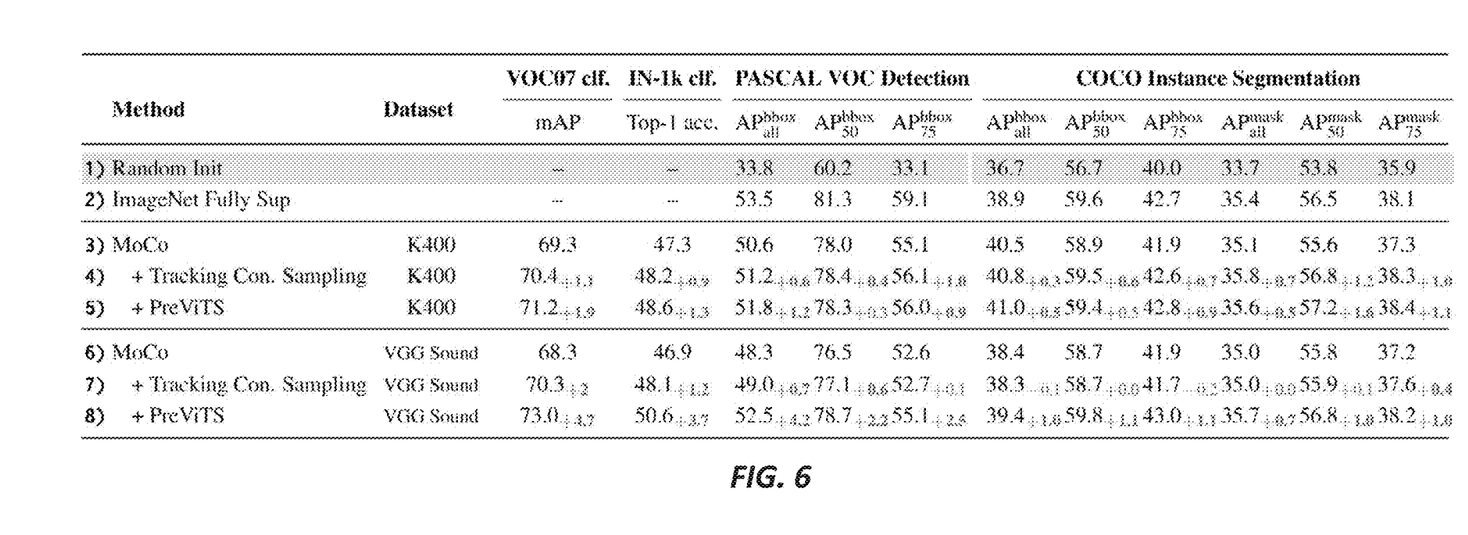
FIGS. 6-12 provide example data performance charts and examples for illustrating example performance of embodiments described herein.

FIG. 6 shows that training PreViTS outperforms baseline MoCo training on all tasks, obtaining robust gains in VOC and ImageNet classification, along with VOC detection and COCO instance classification. Notably, the performance gains when pretraining on VGG-Sound are larger as compared to those on Kinetics-400, even though Kinetics-400 is 20% larger in terms of the number of videos. It is possible that due to VGG-Sound containing a more diverse collection of objects as compared to Kinetics-400, which is primarily human action-centric, VGG-Sound benefits more from being able to learn object-focused representations when training with PreViTS. The performance improvement over baseline is especially large on the VOC detection task, aided by the improved ability to localize objects during pretraining. Finally, while it is typically challenging to obtain comparable performance to supervised ImageNet pretraining using video SSL pretraining on image recognition tasks, due to the larger domain shift, MoCo models trained with PreViTS still obtain comparable or better performance to ImageNet-fully supervised training on VOC detection and COCO instance segmentation tasks.

Figure 7:
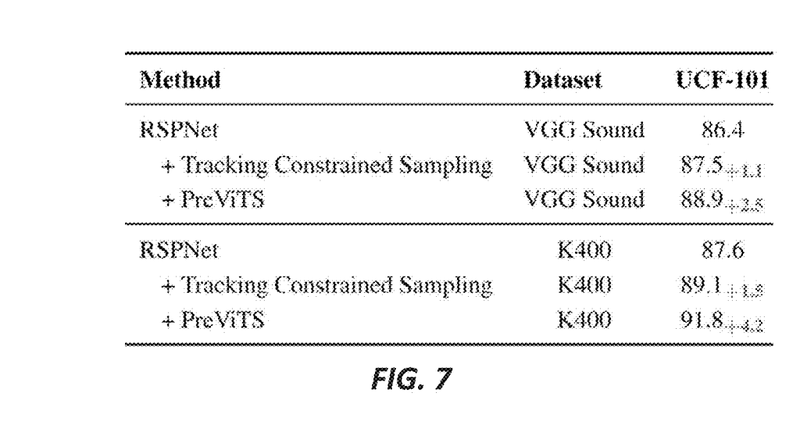
Figure 8:
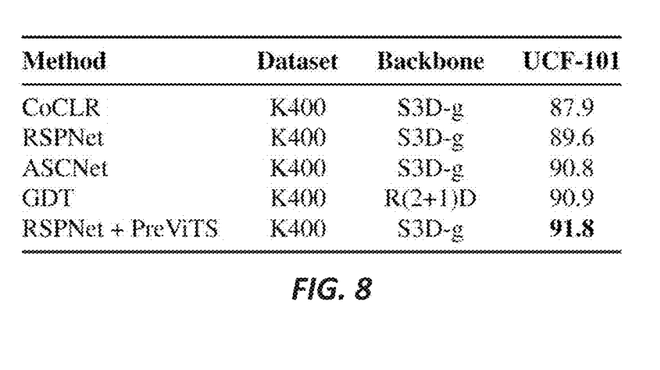

To evaluate the performance of PreViTS-trained models on video classification tasks, we perform action recognition on the UCF-101 dataset (Soomro et al., Ucf101: A dataset of 101 human actions classes from videos in the wild, ArXiv preprint, 2012). In example experiments, the pretrained model is finetuned on labeled videos with 50 epochs using a learning rate of 0.05. The projection head is dropped and replace it with a randomly initialized fully-connected layer. The experiments report top-1 accuracy on the UCF-101 dataset when pretraining with PreViTS on VGG-Sound and Kinetics-400 datasets (FIG. 7). Training with PreViTS obtains a substantial improvement over RSP-Net on both pretraining datasets. Notably, the model pre-trained on Kinetics-400 had better performance with RSP-Net and a larger absolute improvement with RSPNet+PreViTS (4.2% versus 2.5%), over VGG-Sound. It is possible that since human actions are better represented in Kinetics 400, the representation learnt using these videos transfers better to UCF-101, and also benefits more from training with Pre- ViTS. Finally, the performance of RSPNet+PreViTS pretrained with Kinetics-400 with other state-of-the-art video SSL methods in FIG. 8. With the same architecture, computational budget, epoch, batch size, and pretraining data for a fair comparison, PreViTS outperforms prior work and obtains state-of-the-art performance.

Figure 9:
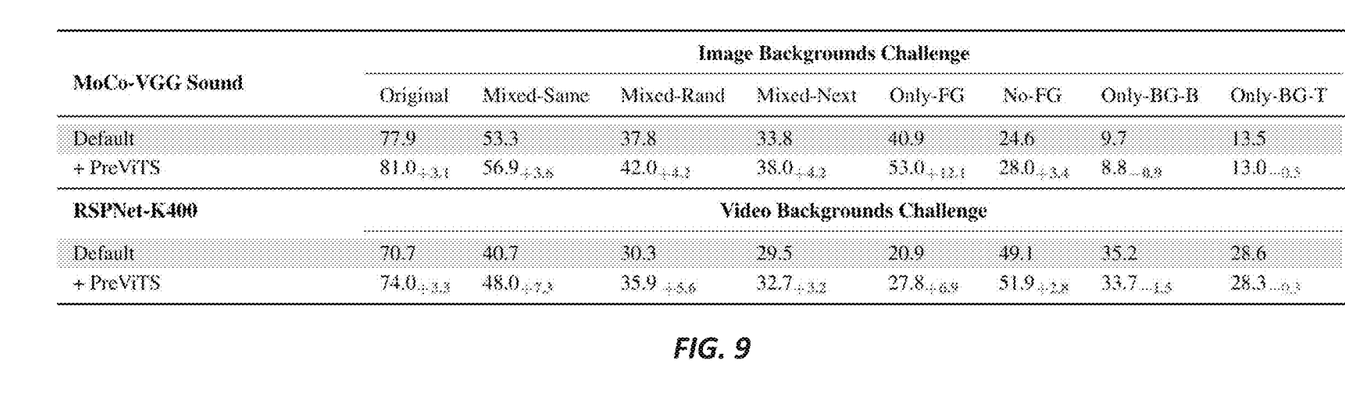

FIG. 9 shows "backgrounds challenge" on both image and video classification tasks. First, experiments evaluate the PreViTS model on the original Backgrounds Challenge (Xiao et al., Noise or signal: The role of image backgrounds in object recognition. In Proc. of ICLR, 2021), which was designed to test a model's robustness to various background changes. It contains 9 ImageNet classes with 450 images for each class. We evaluate our model along with the baseline model pretrained on VGG-Sound and train a linear layer with ImageNet-1K. Results show that pretraining with PreViTS achieves significant improvement on all tasks defined in the Backgrounds Challenge. Examples of different settings can be found in FIG. 10. In the Only-FG setting, where the background is set to black, PreViTS obtains an absolute improvement of 12.1%, showing that it is less dependent on background information. When back-grounds are swapped (Mixed-Same, Mixed-Rand, Mixed-Next), PreViTS obtains an absolute improvement of 3.6-4.2%, indicating that representations learnt with PreViTS reduce the reliance on background correlations. There is a slight increase in performance in the No-FG setting, likely due to the model learning contour information from videos. However, in settings where no information from the foreground is provided (Only-BG-B, and Only-BG-T), PreViTS obtains lower accuracy than baseline, which reinforces that it is less dependent on the background signal.

In addition to the image Backgrounds Challenge, experiments construct a new Video Backgrounds Challenge to test background-robustness on videos. The JHMDB dataset (Jhuang et al., Towards understanding action recognition, In IEEE International Conference on Computer Vision, 2013) consists of 21 HMDB (Kuehne et al., HMDB: A large video database for human motion recognition, in IEEE International Conference on Computer Vision, 2011) action recognition classes with 50 videos per class—for which the ground truth foreground mask is available. 8 foreground-background combinations (FIG. 12) for JHMBD. Experiments evaluate performance using a model trained on Kinetics-400 and finetuned on UCF-101. Models trained with PreViTS outperform the baseline model (RSPNet) in all settings. Similar to the trends on Image Backgrounds Challenge, PreViTS obtains significant improvement in settings where the background is set to black or is replaced by background from another video. In settings where the foreground is removed, we find the accuracy drop to be higher for PreViTS compared to baseline (22.1 vs. 21.6). Video representation learning models have been shown to suffer from over-reliance on background information, called representation bias or scene bias. Training with PreViTS can help mitigate this bias.

Figure 10:
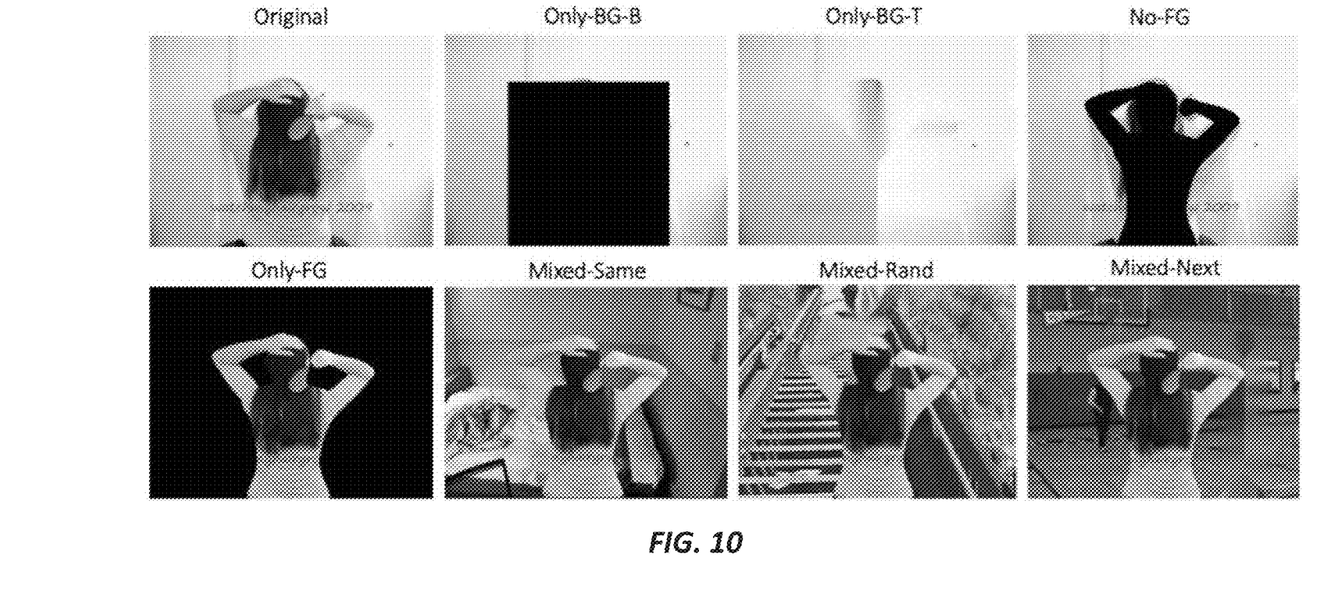
Figure 11:
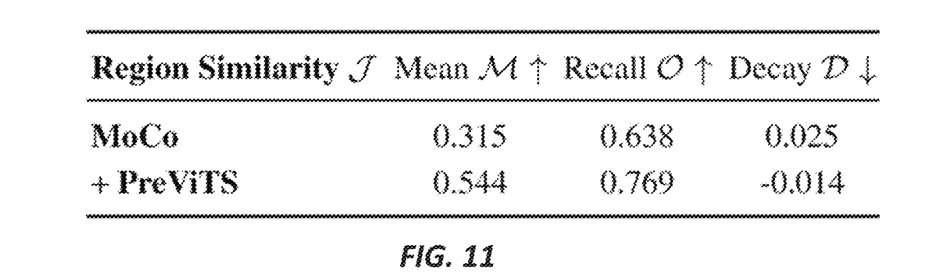

To demonstrate grounding and tracking ability, experiments are conducted to evaluate our model on the single object video tracking dataset in Grad-CAM attention fashion. In the original video tracking task, the input is the first frame of the video along with the foreground segmentation mask. The goal is to predict the pixel-level mask of the foreground in the later video frames. Example pipelines as shown in FIG. 10 to perform tracking. The first frame and its segmentation to acquire the key foreground. Then, experiments feed the later frames as queries and compute the Grad-CAM attention heatmap to localize the corresponding region in the later frames. Since the attention heatmap resolution is 7×7, pixel-level prediction cannot be performed. Evaluation metrics compute: Region similarity (J), which represents the IOU between the predicted foreground mask and GT foreground mask; Mean (M) is the average value of J; Recall (O) evaluates the fraction of sequences scoring higher than a threshold; Decay (D) evaluates the averaged performance drop over time, e.g., $J_{t=4} - J_{t=1}$. As shown in FIG. 11, PreViTS outperforms the baseline MoCo by a significant margin, which demonstrates our model's ability to localize objects in dynamic videos.

Figure 12:
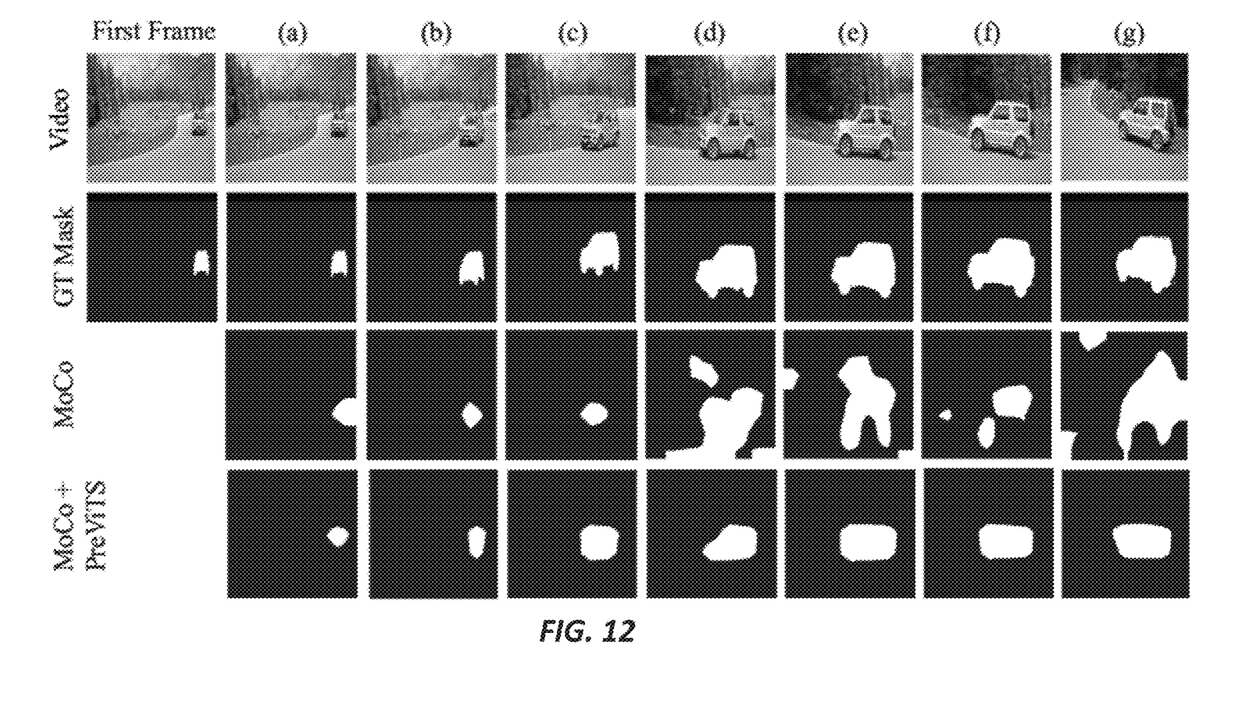

FIG. 12 shows how PreViTS is able to localize objects while the baseline fails when the object appears in a novel viewpoint (FIG. 4(d)).

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

This application is further described with respect to the attached document in Appendix I., entitled "PreViTS: Contrastive Pretraining with Video Tracking Supervision," 11 pages, which is considered part of this disclosure and the entirety of which is incorporated by reference.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of pretraining a vision model, the method comprising:
receiving, via a communication interface, an input video;
extracting a first set of video frames from the input video subject to a temporal constraint, wherein each of the first set of video frames corresponds to a respective area of salient region that is non-zero;
generating a first set of saliency maps as tracking masks corresponding to the first set of video frames;

generating, a key crop and a query crop from the first set of video frames subject to a spatial constraint that the key crop and the query crop satisfy an intersection over union (IOU) threshold with a respective tracking mask from the tracking masks;
encoding, by a momentum encoder, the key crop into a key feature representation;
encoding, by an encoder of the vision model, the query crop into a query feature representation;
computing a contrastive loss based on the key feature representation and the query feature representation; and
updating the vision model based at least in part on the contrastive loss.

2. The method of claim 1, wherein the first set of video frames are sampled by:
obtaining a saliency map for an initial frame of the input video; and
tracking a target object in the saliency map throughout the input video by checking an IOU constraint across continuous frame masks in the input video.

3. The method of claim 1, wherein the key crop and the query crop sampled from the input video serve as a positive pair for contrastive learning, and
wherein the key crop paired with another query crop sampled from another different video form a negative pair for contrastive learning.

4. The method of claim 1, further comprising:
sampling, from the input video, a first video segment and a second video segment having a same speed, and a third video segment having a different speed;
forming a positive input pair of the first video segment and the second video segment;
forming a negative input pair of the first video segment or the second video segment and the third video segment;
inputting the positive input pair and the negative input pair to the vision model;
computing a speed loss based on a difference between a distance between the positive input pair and the negative input pair in a feature space and a pre-defined margin; and
updating the vision model by a weighted sum of the contrastive loss and the speed loss.

5. The method of claim 1, further comprising:
generating a key foreground of the key crop; and
generating, by the momentum encoder, a key foreground feature representation from the key foreground;
computing an attention heatmap based on the query feature representation and the key foreground feature representation.

6. The method of claim 5, wherein the attention heatmap is computed based on a linear combination of a product between a last convolutional layer activation of the encoder and an importance metric of the last convolution layer of the encoder.

7. The method of claim 6, wherein the importance metric of the last convolution layer of the encoder is computed based on the key foreground feature representation and gradients of the last convolutional layer activations of the encoder.

8. The method of claim 5, further comprising:
generating a pseudo segmentation ground truth by averaging tracking masks corresponding to the query crop; and
computing an attention loss based on the attention heatmap and the pseudo segmentation ground truth.

9. The method of claim 8, further comprising:
computing a weighted sum of the attention loss and the contrastive loss; and
updating the vision model based on the weighted sum when the vision model is an image model.

10. The method of claim 8, further comprising:
computing a weighted sum of the attention loss, the contrastive loss and a speed loss computed based on samples sampled at different video speeds; and
updating the vision model based on the weighted sum when the vision model is a video model.

11. A system of pretraining a vision model, the system comprising:
a communication interface receiving an input video;
a memory storing a plurality of processor-executable instructions;
a processor executing the plurality of processor-executable instructions to perform operations comprising:
extracting a first set of video frames from the input video subject to a temporal constraint, wherein each of the first set of video frames corresponds to a respective area of salient region that is non-zero;
generating a first set of saliency maps as tracking masks corresponding to the first set of video frames;
generating, a key crop and a query crop from the first set of video frames subject to a spatial constraint that the key crop and the query crop satisfy an intersection over union (IOU) threshold with a respective tracking mask from the tracking masks;
encoding, by a momentum encoder, the key crop into a key feature representation;
encoding, by an encoder of the vision model, the query crop into a query feature representation;
computing a contrastive loss based on the key feature representation and the query feature representation; and
updating the vision model based at least in part on the contrastive loss.

12. The system of claim 11, wherein the first set of video frames are sampled by:
obtaining a saliency map for an initial frame of the input video; and
tracking a target object in the saliency map throughout the input video by checking an IOU constraint across continuous frame masks in the input video.

13. The system of claim 11, wherein the key crop and the query crop sampled from the input video serve as a positive pair for contrastive learning, and
wherein the key crop paired with another query crop sampled from another different video form a negative pair for contrastive learning.

14. The system of claim 11, wherein the operations further comprise:
sampling, from the input video, a first video segment and a second video segment having a same speed, and a third video segment having a different speed;
forming a positive input pair of the first video segment and the second video segment;
forming a negative input pair of the first video segment or the second video segment and the third video segment;
inputting the positive input pair and the negative input pair to the vision model;
computing a speed loss based on a difference between a distance between the positive input pair and the negative input pair in a feature space and a pre-defined margin; and
updating the vision model by a weighted sum of the contrastive loss and the speed loss.

15. The system of claim 11, wherein the operations further comprise:
  generating a key foreground of the key crop; and
  generating, by the momentum encoder, a key foreground feature representation from the key foreground;
  computing an attention heatmap based on the query feature representation and the key foreground feature representation.

16. The system of claim 15, wherein the attention heatmap is computed based on a linear combination of a product between a last convolutional layer activation of the encoder and an importance metric of the last convolution layer of the encoder, and
  wherein the importance metric of the last convolution layer of the encoder is computed based on the key foreground feature representation and gradients of the last convolutional layer activations of the encoder.

17. The system of claim 15, wherein the operations further comprise:
  generating a pseudo segmentation ground truth by averaging tracking masks corresponding to the query crop; and
  computing an attention loss based on the attention heatmap and the pseudo segmentation ground truth.

18. The system of claim 17, wherein the operations further comprise:
  computing a weighted sum of the attention loss and the contrastive loss; and
  updating the vision model based on the weighted sum when the vision model is an image model.

19. The system of claim 17, wherein the operations further comprise:
  computing a weighted sum of the attention loss, the contrastive loss and a speed loss computed based on samples sampled at different video speeds; and
  updating the vision model based on the weighted sum when the vision model is a video model.

20. A non-transitory processor-readable storage medium storing a plurality of processor-executable instructions for pretraining a vision model, the instructions being executed by a processor to perform operations comprising:
  receiving, via a communication interface, an input video;
  extracting a first set of video frames from the input video subject to a temporal constraint, wherein each of the first set of video frames corresponds to a respective area of salient region that is non-zero;
  generating a first set of saliency maps as tracking masks corresponding to the first set of video frames;
  generating, a key crop and a query crop from the first set of video frames subject to a spatial constraint that the key crop and the query crop satisfy an intersection over union (IOU) threshold with a respective tracking mask from the tracking masks;
  encoding, by a momentum encoder, the key crop into a key feature representation;
  encoding, by an encoder of the vision model, the query crop into a query feature representation;
  computing a contrastive loss based on the key feature representation and the query feature representation; and
  updating the vision model based at least in part on the contrastive loss.

* * * * *